(12) United States Patent
Hattori

(10) Patent No.: US 8,976,268 B2
(45) Date of Patent: Mar. 10, 2015

(54) IMAGE PROCESSING APPARATUS AND IMAGE PROCESSING METHOD FOR PERFORMING IMAGE SYNTHESIS

(71) Applicant: Canon Kabushiki Kaisha, Tokyo (JP)

(72) Inventor: Mitsuaki Hattori, Chigasaki (JP)

(73) Assignee: Canon Kabushiki Kaisha (JP)

( * ) Notice: Subject to any disclaimer, the term of this patent is extended or adjusted under 35 U.S.C. 154(b) by 40 days.

(21) Appl. No.: 13/834,121

(22) Filed: Mar. 15, 2013

(65) Prior Publication Data
US 2013/0278798 A1  Oct. 24, 2013

(30) Foreign Application Priority Data

Apr. 20, 2012 (JP) ................................. 2012-096518

(51) Int. Cl.
*H04N 5/262* (2006.01)
*H04N 5/235* (2006.01)
*H04N 5/232* (2006.01)

(52) U.S. Cl.
CPC ........... *H04N 5/2351* (2013.01); *H04N 5/2353* (2013.01); *H04N 5/23232* (2013.01); *H04N 5/23258* (2013.01); *H04N 5/23267* (2013.01)
USPC ........................................................ 348/234

(58) Field of Classification Search
CPC ..... H04N 9/045; H04N 9/646; H04N 5/2351; H04N 5/2353; H04N 5/235; H04N 5/2354; H04N 5/2256; H04N 5/23248; H04N 5/23258; H04N 5/23254; G03B 15/05
USPC ................. 348/234, 362, 364, 365, 370–371, 348/222.1, 208.99, 208.12, 208.13; 382/274, 167, 276
See application file for complete search history.

(56) References Cited

U.S. PATENT DOCUMENTS

| | | | |
|---|---|---|---|
| 6,654,062 B1 * | 11/2003 | Numata et al. | 348/362 |
| 7,057,650 B1 * | 6/2006 | Sakamoto | 348/239 |
| 7,583,297 B2 * | 9/2009 | Yamada | 348/224.1 |
| 7,688,353 B2 * | 3/2010 | Ishikawa et al. | 348/208.5 |
| 7,986,853 B2 * | 7/2011 | Washisu | 382/274 |
| 8,248,485 B2 * | 8/2012 | Ishii et al. | 348/222.1 |
| 8,493,502 B2 * | 7/2013 | Manabe | 348/371 |
| 2004/0238718 A1 * | 12/2004 | Washisu | 250/201.2 |

(Continued)

FOREIGN PATENT DOCUMENTS

JP    2007-124292 A    5/2007

*Primary Examiner* — Aung S Moe
(74) *Attorney, Agent, or Firm* — Rossi, Kimms & McDowell LLP

(57) ABSTRACT

An image processing apparatus capable of properly synthesizing a strobe-illuminated image and non-strobe-illuminated images, irrespective of a condition for illuminating a photographic subject. A sensitivity of strobe emission photographing is set to be lower than a sensitivity of non-strobe emission photographing, and a strobe-illuminated image and plural sheets of non-strobe-illuminated images are continuously photographed with the set sensitivities. The strobe-illuminated image is gain-processed with a gain amount, and positional deviations of the plural sheets of non-strobe-illuminated images relative to the strobe-illuminated image are corrected. An averaged image obtained by synthesizing the gain-processed image and the images after the positional deviation correction is synthesized with the strobe-illuminated image, while taking account of amounts of strobe illumination in the strobe-illuminated image, thereby obtaining a synthesized image.

16 Claims, 6 Drawing Sheets

(56) References Cited

U.S. PATENT DOCUMENTS

| | | | |
|---|---|---|---|
| 2004/0239779 A1* | 12/2004 | Washisu | 348/239 |
| 2007/0165960 A1* | 7/2007 | Yamada | 382/254 |
| 2007/0201853 A1* | 8/2007 | Petschnigg | 396/155 |
| 2009/0009636 A1* | 1/2009 | Endo | 348/241 |
| 2010/0238320 A1* | 9/2010 | Washisu | 348/229.1 |
| 2012/0133797 A1* | 5/2012 | Sato et al. | 348/239 |
| 2013/0278798 A1* | 10/2013 | Hattori | 348/234 |

* cited by examiner

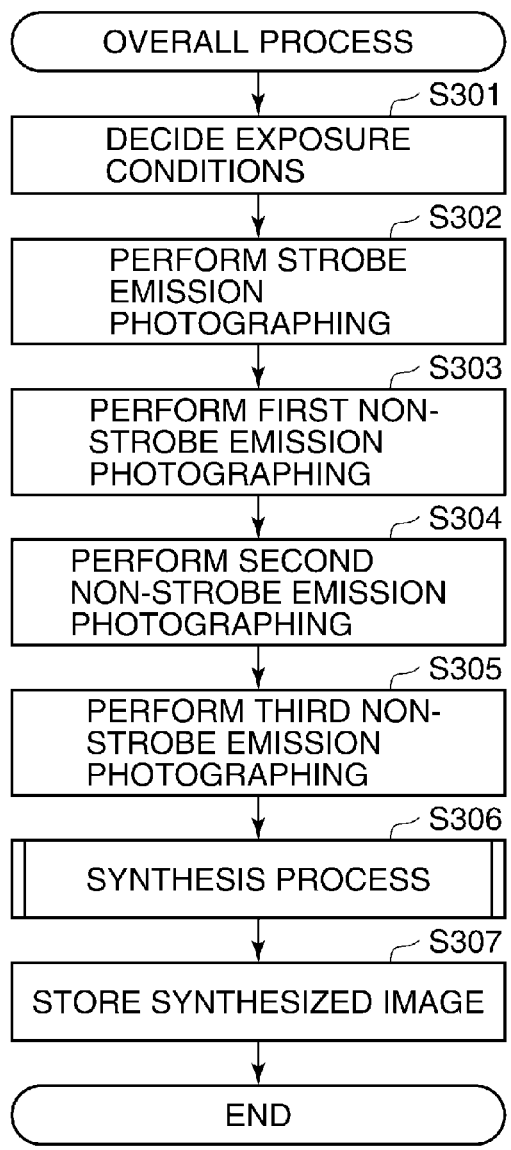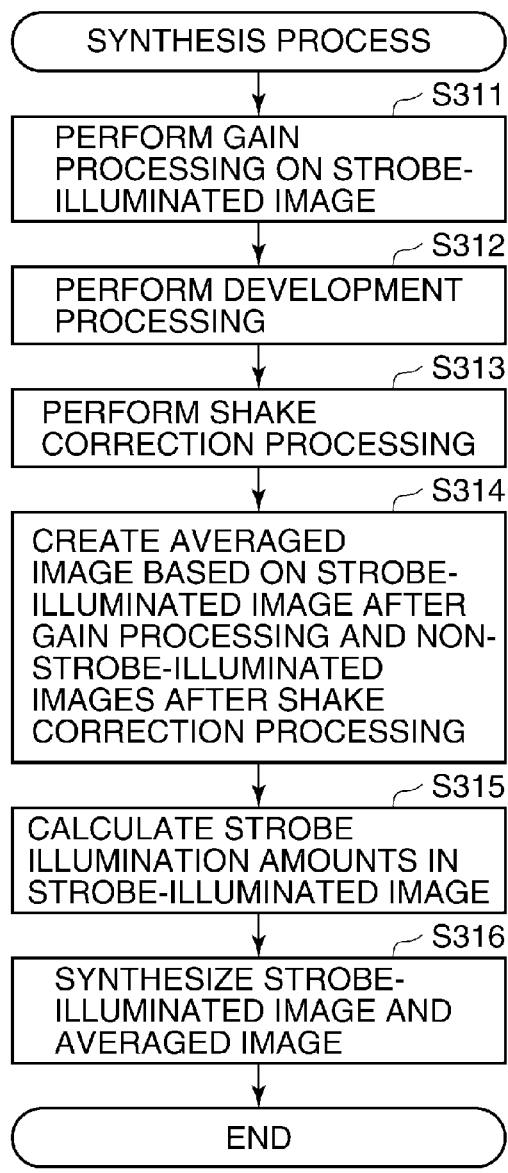
FIG. 3A
FIG. 3B

POSITION ALIGNMENT REFERENCE IMAGE

POSITION ALIGNMENT OBJECT IMAGE

| 1 | 5 | 6 | 7 |
|---|---|---|---|
| 3 | 7 | 6 | 8 |
| 4 | 5 | 7 | 9 |
| 5 | 6 | 6 | 7 |

| 3 | 3 | 7 | 4 | 5 | 5 | 6 | 7 |
|---|---|---|---|---|---|---|---|
| 3 | 4 | 8 | 5 | 6 | 6 | 6 | 8 |
| 2 | 1 | 5 | 6 | 7 | 8 | 3 | 7 |
| 8 | 3 | 7 | 6 | 8 | 9 | 4 | 5 |
| 9 | 4 | 5 | 7 | 9 | 5 | 6 | 7 |
| 7 | 5 | 6 | 6 | 7 | 7 | 6 | 8 |
| 6 | 7 | 8 | 3 | 7 | 5 | 6 | 7 |
| 5 | 6 | 6 | 6 | 8 | 8 | 3 | 7 |

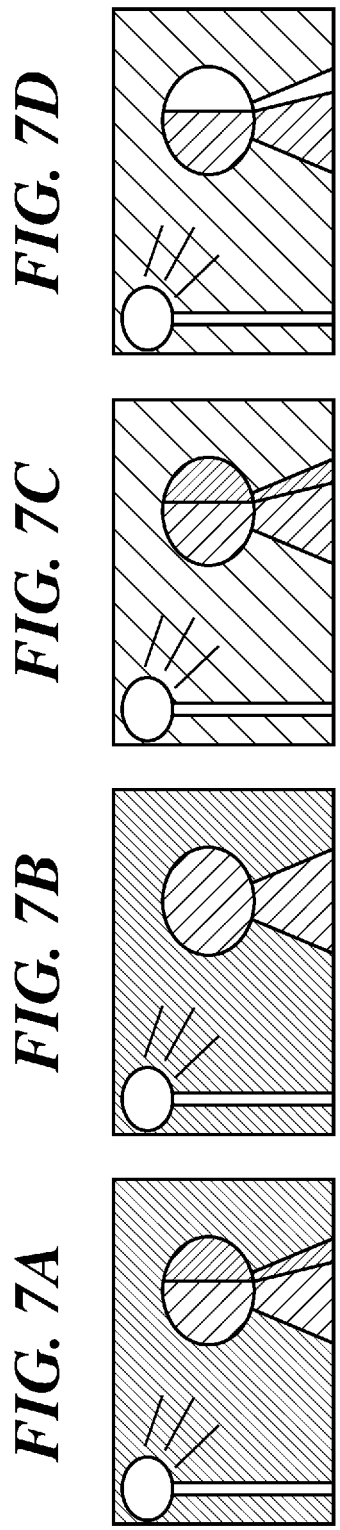

IMAGE PROCESSING APPARATUS AND IMAGE PROCESSING METHOD FOR PERFORMING IMAGE SYNTHESIS

BACKGROUND OF THE INVENTION

1. Field of the Invention

The present invention relates to an image processing apparatus and an image processing method for synthesizing plural sheets of images.

2. Description of the Related Art

To photograph a night scene with an image pickup apparatus such as a digital camera that is hand-held, photographing is performed with high sensitivity to suppress hand-shake, however, this results in increased noise. It is therefore known to align plural sheets of images photographed with high sensitivity, arithmetically average pixel values of the images on a per pixel basis, and synthesize the averaged pixel values, thereby obtaining a less noisy image while suppressing hand-shake.

An image pickup apparatus is also known, in which a single sheet of strobe-illuminated image photographed while irradiating light onto a photographic subject from a light emission unit (strobe unit) is synthesized with plural sheets of non-strobe-illuminated images photographed without using the light emission unit (see, for example, Japanese Laid-open Publication No. 2007-124292).

In this image pickup apparatus, when photographing is performed while causing the strobe unit to emit light, sensitivity is set to be low. When photographing is performed while not causing the strobe unit to emit light, sensitivity is set to be high. Next, ratios for synthesis of the strobe-illuminated image and the non-strobe-illuminated image are decided on a per pixel basis, and these images are synthesized based on the decided synthesis ratios. For example, a brightness value of each pixel of the strobe-illuminated image is compared in magnitude with a brightness value of a corresponding pixel of the non-strobe-illuminated image, and these images are synthesized by using pixels, whichever are greater in brightness value (i.e., by setting synthesis ratios of 100% for pixels which are greater in brightness value).

However, in a case, for example, that there is a shadow area in a human subject area illuminated with illumination light, the strobe-illuminated image is not used for the human subject area in some cases. In that case, the synthesized image becomes unnatural.

SUMMARY OF THE INVENTION

The present invention provides an image processing apparatus and an image processing method that are capable of properly synthesizing a strobe-illuminated image and non-strobe-illuminated images, irrespective of a condition for illuminating a photographic subject.

According to one aspect of this invention, there is provided an image processing apparatus comprising a photographing unit configured to continuously photograph a first image by first photographing with an emission by an emission unit and plural sheets of second images by second photographing without the emission, a sensitivity setting unit configured to set a sensitivity of the first photographing to be lower than a sensitivity of the second photographing, a gain processing unit configured to perform gain processing in which image data of the first image is multiplied by a gain amount, an averaging unit configured to create an averaged image based on the first image gain processed by the gain processing unit and the plural sheets of the second images, and a synthesis unit configured to create a synthesized image by synthesizing the first image photographed by the photographing unit and the averaged image created by the averaging unit.

With this invention, it is possible to properly synthesize the strobe-illuminated image and the non-strobe-illuminated images, irrespective of a condition for illuminating a photographic subject.

Further features of the present invention will become apparent from the following description of an exemplary embodiment with reference to the attached drawings.

BRIEF DESCRIPTION OF THE DRAWINGS

FIG. 3A is a flowchart showing the procedures of an overall process in which plural sheets of images are photographed and synthesized;

FIG. 3B is a flowchart showing the procedures of a synthesis process performed in the overall process;

FIGS. 6A to 6C are views showing an example of a photographic scene with human subject against the backdrop of a night scene; and FIGS. 7A to 7D are views showing an example of a scene with illuminated human subject, examples of photographed images, and an example of a synthesized image.

DESCRIPTION OF THE EMBODIMENTS

The present invention will now be described in detail below with reference to the drawings showing a preferred embodiment thereof.

Figure 1:
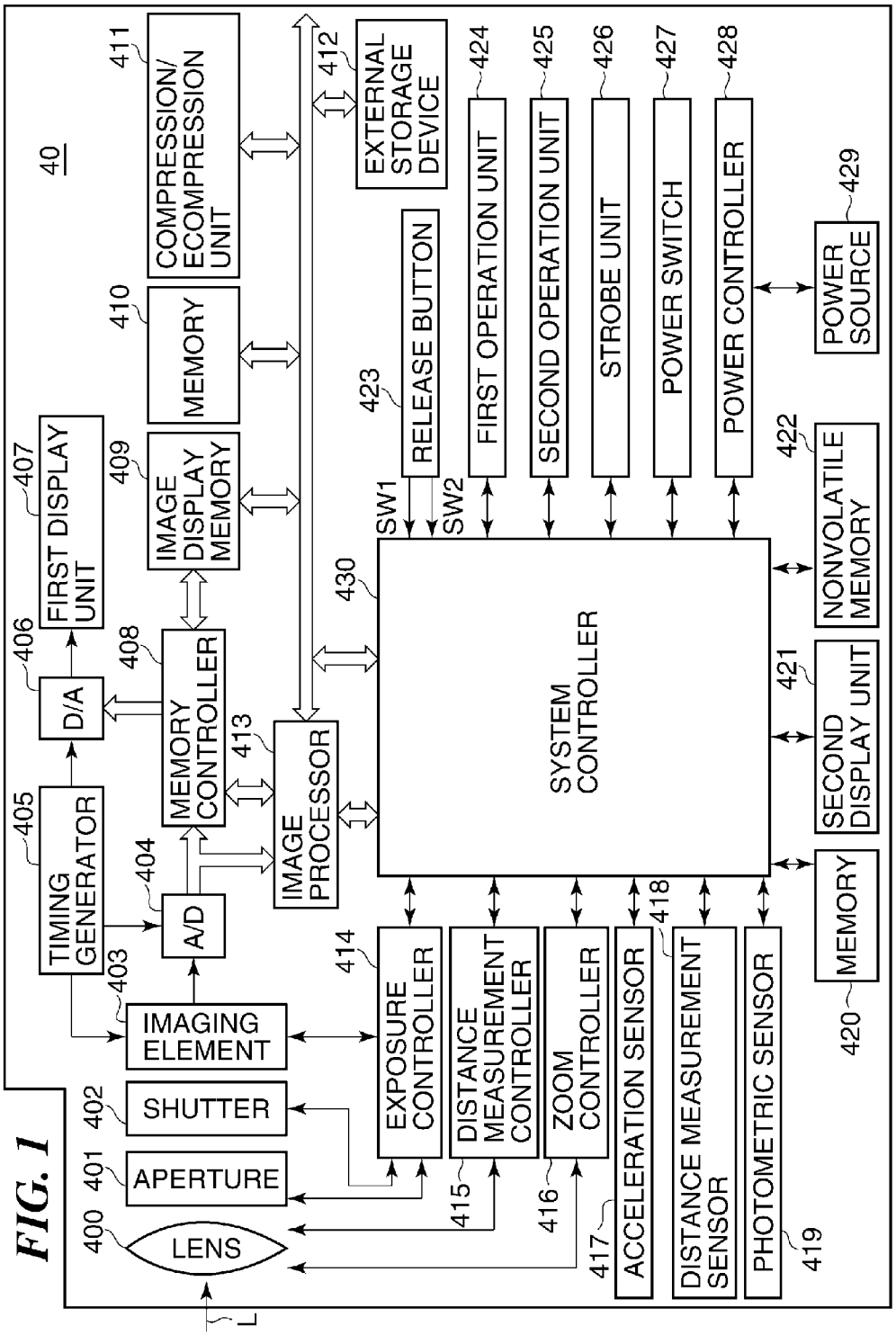
FIG. 1 is a block diagram showing a hardware structure of a digital still camera, which is an example image processing apparatus according to one embodiment of this invention.

FIG. 1 shows in block diagram a hardware structure of a digital still camera, which is an example image processing apparatus according to one embodiment of this invention.

In FIG. 1, reference numeral 40 denotes a digital still camera that includes a photographing lens 400, an aperture 401, a shutter 402, and an imaging element 403 by which light flux L (optical image) entering the photographing lens 400 is converted into an electrical signal. The elements 400 to 403 constitute a photographing unit.

The digital still camera 40 further includes an A/D converter 404 by which an analog signal output from the imaging element 403 is converted into a digital signal, and a timing generator 405 that supplies a clock signal and a control signal to the imaging element 403, to the A/D converter 404, and to a D/A converter 406.

A memory controller 408 controls the A/D converter 404, timing generator 405, D/A converter 406, image display memory 409, memory 410, compression/decompression unit 411, and image processor 413. Digital data obtained by A/D conversion by the A/D converter 404 is written into the image display memory 409 or into the memory 410 through the image processor 413 and the memory controller 408 or through the memory controller 408.

The image display memory 409 stores image display data that is output through the D/A converter 406 to a first display unit 407 such as a liquid crystal display (LCD). On the first display unit 407 various menus (such as a white balance selection menu) are displayed from which a desired menu can be selected and displayed by operating a first operation unit 424.

The memory 410 has a storage capacity for storing a predetermined number of photographed still images and is used by a system controller 430 and by the image processor 413 for their work area. The compression/decompression unit 411 reads image data stored in the memory 410 to perform compression processing thereon, reads compressed image data to perform decompression processing thereon, and writes the processed data into the memory 410. An external storage device 412 is an externally attached storage medium (such as CF card, SD card or the like) that can be mounted to and dismounted from a body of the digital still camera 40. Image data temporarily stored in the memory 410 is finally stored into the external storage device 412.

The image processor 413 performs various image processing (such as white balance processing, color interpolation processing for converting a RGB Bayer pattern RGB signal into a three-plane RGB signal, gamma processing, chroma processing, and color hue processing) on data supplied from the A/D converter 404 or supplied from the memory controller 408. Also, the image processor 413 performs a synthesis process for synthesizing plural sheets of image data, as will be described later.

The digital still camera 40 has a photometric sensor 419 that measures brightnesses of pixels that are conjugated with an imaging surface. Based on an output from the photometric sensor 419, the system controller 430 calculates a proper amount of exposure. Based on the calculated exposure amount, an exposure controller 414 controls ISO sensitivities of the aperture 401, the shutter 402, and the imaging element 403. A distance measurement sensor 418 detects distance information of a distance measuring point that is arbitrarily selected by a user. Based on an output from the distance measurement sensor 418, a distance measurement controller 415 controls focusing of the photographing lens 400.

A zoom controller 416 detects an amount of manual zooming (focal distance) of the photographing lens 400 in the digital still camera 40, and controls a zoom amount of the photographing lens 400 in a case where zooming is automatically performed. A strobe unit (strobe emission unit) 426 achieves an AF auxiliary light projection function and a strobe light adjustment function of the digital still camera 40. An acceleration sensor 417 detects a horizontal/vertical shake of the digital still camera 40. Detected information is used for known hand shake correction, determination of portrait/landscape photographing, etc.

A system controller 430 controls the entire operation of the digital still camera 40. Constants, variable programs, image processing parameters for use in operation of the system controller 430 are stored in a memory 420, which is also used as a work memory for the system controller 430.

With the progress of execution of a program by the system controller 430, a second display unit 421 that includes a liquid crystal display unit, a speaker, etc. notifies a photographer of an operation status of the camera or a message in terms of character, image, voice, or the like. On the second display unit 421 there are displayed single/continuous/self-timer shooting, compression ratio, number of recording pixels, number of recording sheets, number of remaining recordable sheets, shutter speed, aperture value, exposure correction, residual amount of battery, error, attachment/detachment state of external storage device 412, etc. At the time of changing the displayed content or at the time of warning, the display unit 421 generates an electronic sound.

Reference numeral 422 denotes a nonvolatile memory such as EEPROM, in which data can be electrically erasably stored.

A release button 423 cooperates with a second operation unit 425 to constitute an operation unit for inputting various operation instructions for the system controller 430. The release button 423 has a switch SW1 configured to be turned on when pressed by a first stroke (half pressed) and a switch SW2 configured to be turned on when pressed by a second stroke (fully pressed). Light measurement and distance measurement are started when the switch SW1 is turned on, and an exposure operation is started when the switch SW2 is turned on.

By operating the second operation unit 425, it is possible to perform switching between single-shooting, continuous shooting, and self-timer shooting, to perform switching between manual focusing and auto focusing, and to set the shutter speed, aperture value, exposure correction, etc. It should be noted that in a case where continuous shooting has been set by operating the second operation unit 425, continuous shooting is performed while the switch SW2 of the release button 423 is pressed.

The digital still camera 40 has a main power source that is turned on and off by a power switch 427.

A power controller 428 includes a battery detection unit, a DC/DC converter, switches for switching blocks to be supplied with power, etc. that are operated under the control of the system controller 430. The power controller 428 detects attachment/detachment of a battery (serving as a power source 429) to the digital still camera 40, battery type, residual amount of battery, and based on a result of the detection, controls the DC/DC converter so as to supply required voltages to respective parts of the camera for required periods of time. It should be noted that a primary battery such as alkaline battery or lithium battery, or a secondary battery such as NiCd battery, NiMH battery, or Li battery, or an AC adapter can be used as the power source 429.

In the following, a description will be given of how a strobe-illuminated image (a first image) and non-strobe-illuminated images (second images) are synthesized to properly photograph a scene with human subject against the backdrop of a night scene. FIGS. 6A to 6C show an example of a photographic scene with human subject against the backdrop of a night scene. FIG. 6A shows an example of a strobe-illuminated image photographed with low sensitivity, while flashing light from a strobe unit (an emission unit) so as to illuminate the human subject with a proper brightness. FIG. 6B shows an example of a non-strobe-illuminated image photographed with high sensitivity, while not flashing light from the strobe unit. FIG. 6C shows an example of a synthesized image obtained by synthesizing the images shown in FIGS. 6A and 6B.

By synthesizing plural sheets of non-strobe-illuminated images such as shown in FIG. 6B in terms of arithmetic average, it is possible to reduce noise resulting from high sensitivity photographing. Thus, plural sheets of non-strobe-illuminated images such as shown in FIG. 6B are photographed, and the photographed images are arithmetically averaged to create a synthesized image (hereinafter, referred to as the non-illuminated synthesized image). The non-illuminated synthesized image thus created is synthesized with a single strobe-illuminated image of FIG. 6A, while comparing magnitudes of pixel value data. In this synthesis, the strobe-illuminated image is used for a human area illuminated with strobe light, whereas the non-illuminated synthesized image is used for a background area not illuminated with strobe light. As a result, it is possible to obtain an image with bright background and bright human subject and with less noisy and less hand shake.

A description will be given of the image synthesis with reference to FIGS. 7A to 7D respectively showing an example scene where a human subject is illuminated, example photographic images, and an example synthesized image.

FIG. 7A shows a photographic scene against the backdrop of a night scene. As shown in FIG. 7A, a human subject has an illumination area to which illumination (street light) is irradiated and a shadow area where illumination is shadowed. FIG. 7B shows a strobe-illuminated image photographed with low sensitivity. FIG. 7C shows a non-strobe-illuminated image photographed with high sensitivity. FIG. 7D shows a synthesized image of the strobe-illuminated image shown in FIG. 7B and the non-strobe-illuminated image shown in FIG. 7C.

In the illumination area of the human subject, the non-strobe-illuminated image of FIG. 7C sometimes becomes brighter than the strobe-illuminated image of FIG. 7B when brightness of the strobe-illuminated image and brightness of the non-strobe-illuminated image are compared with each other on a per pixel basis. On the other hand, in the shadow area of the human subject, the strobe-illuminated image of FIG. 7B sometimes becomes brighter than the non-strobe-illuminated image of FIG. 7C.

In a case where either pixel values of the image of FIG. 7B or pixel values of the image of FIG. 7C, whichever are brighter, are used on a per pixel basis for creation of synthesized image, the synthesized image of FIG. 7D is obtained. In the synthesized image of FIG. 7D, the strobe-illuminated image is used for the shadow area of the human subject and the non-strobe-illuminated image is used for the illumination area of the human subject. As a result, an unnatural image is created.

To obviate this, in the present embodiment, an amount of strobe illumination representing influence of strobe light is calculated based on a difference between the strobe-illuminated and non-strobe-illuminated images, and image synthesis is performed while taking into account the amount of strobe illumination. It is therefore possible to properly take into account of the influence of strobe light even when a photographic scene contains one or more human subjects. For example, a proper synthesized image can be obtained, where a strobe-illuminated image and a non-strobe-illuminated image are not mixed in a single human subject.

With reference to FIGS. 2 to 5, a description will be given of an image synthesis process for synthesizing plural sheets of images, which are obtained by photographing the scene of FIG. 7A with strobe emission (first photographing) and by photographing the scene without strobe emission (second photographing).

Figure 2:
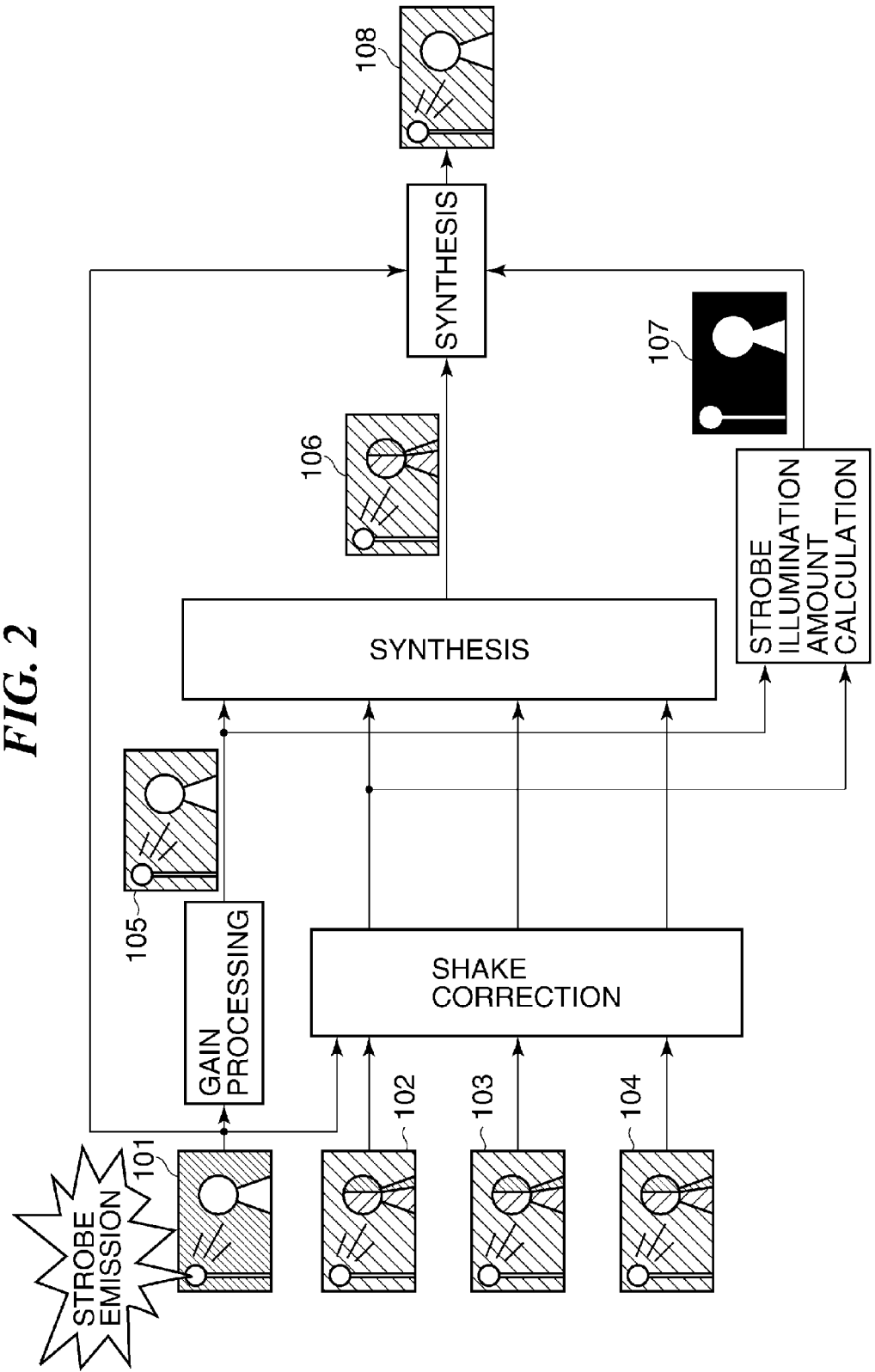
FIG. 2 is a view schematically showing an image synthesis process for synthesizing plural sheets of images.

FIG. 2 schematically shows a process for synthesizing plural sheets of photographed images. FIG. 3A shows in flowchart the procedures of an overall process in which plural sheets of images are photographed and synthesized, and FIG. 3B shows in flowchart the procedures of a synthesis process performed in the overall process.

In the overall process of FIG. 3A, the photometric sensor 419 performs a light measurement operation when the switch SW1 of the release button 423 is pressed. Based on a result of the light measurement, the exposure controller 414 decides an exposure condition for the strobe emission photographing and an exposure condition for the non-strobe emission photographing (step S301). It should be noted that ISO sensitivity, aperture, and shutter time in photographing conditions for the non-strobe emission photographing are so decided as to obtain a proper exposure for photographic images. In this embodiment, the aperture and shutter time in photographing conditions for the strobe-illuminated image are decided to values which are the same as those in the photographing conditions for the non-strobe-illuminated image, and the ISO sensitivity is decided to a value which is one level lower than that in the photographing conditions for the non-strobe-illuminated image.

Next, the switch SW2 of the release button 423 is pressed, and strobe emission photographing is performed (step S302). In a state that the exposure condition is set to a value which is, e.g., one level darker than a proper exposure, strobe emission is so performed as to provide an amount of light emission that will provide a proper exposure of a person who is the main subject. As a result, the human subject illuminated with strobe light is photographed with the proper exposure and the background is photographed with an exposure which is one level darker than the proper exposure, thereby obtaining the image 101 shown in FIG. 2.

In step S303, non-strobe emission photographing is performed with the proper exposure according to the photographing conditions decided in step S301, thereby obtaining the image 102 shown in FIG. 2. In steps S304 and S305, non-strobe emission photographing is performed twice in the same photographing conditions as those in step S303, thereby obtaining the images 103, 104 shown in FIG. 2. Data of the four sheets of images photographed in steps S302 to S305 are temporarily stored in the memory 410.

It should be noted that non-strobe emission photographing is performed three times in this embodiment, but this is not limitative. Although the strobe emission photographing is first performed and the non-strobe emission photographing is then performed in this embodiment, it is possible to change the order in which the strobe emission photographing and the non-strobe emission photographing are performed. For example, the strobe emission photographing can be performed after the first non-strobe emission photographing and before the second non-strobe emission photographing, or can be performed after the last non-strobe emission photographing.

Next, the image processor 413 performs the synthesis process on the four sheets of images whose data are temporarily stored in the memory 410 (step S306). The details of the synthesis process are shown in FIG. 3B.

In the synthesis process of FIG. 3B, gain processing is first performed to multiply each image data (pixel value) of the strobe-illuminated image photographed in step S302 by a digital gain amount G and temporarily store the gain-processed image values into the memory 410 (step S311). In accordance with the following formula (1), the gain amount G used in step S311 is so decided as to compensate for a difference between sensitivities in the exposure conditions decided in step S301 for the strobe-illuminated and non-strobe-illuminated images.

$$G = 2^{\wedge}(\text{Difference between sensitivity of strobe emission photographing and sensitivity of non-strobe emission photographing})  \quad (1)$$

In this embodiment, the sensitivity of strobe emission photographing is set in step S301 to be one level lower than that of non-strobe emission photographing, and therefore the gain amount G becomes twofold in accordance with formula (1).

By strobe emission, a proper exposure is given to the human subject area in the strobe-illuminated image. After the gain processing, a proper exposure is given to the background area (as in the non-strobe-illuminated image), whereas in the human subject area the exposure becomes brighter than the proper exposure. The image 105 shown in FIG. 2 represents the image after the gain processing in step S311.

In step S312, the image processor 413 performs development processing on the five sheets of images (i.e., the images 101 to 105 in FIG. 2) whose data are temporarily stored in the memory 410. More specifically, white balance processing, color interpolation processing for converting a RGB Bayer pattern RGB signal into a three-plane RGB signal, gamma processing, chroma processing, and color hue processing are performed, whereby a YUV image is created. Symbol Y represents a brightness signal, U represents a difference between brightness signal and blue component, and V represents a difference between brightness signal and red component. Data of the YUV image is temporarily stored in the memory 410.

By performing the development processing on all the images in the same condition, it becomes easy to determine a difference between images, and the process for synthesizing the strobe-illuminated image and the non-strobe-illuminated images can easily be performed. Accordingly, the development processing in step S312 is performed in the same condition, irrespective of whether the image to be processed is the strobe-illuminated image or the non-strobe-illuminated image. For example, in the white balance processing, a white balance coefficient with which strobe light for the strobe-illuminated image becomes achromatic is used for both the strobe-illuminated image and the non-strobe-illuminated images, whereby coloration of a person who is the main subject becomes proper. However, it is not inevitably necessary to use such a white balance coefficient.

In step S313, shake correction processing is performed to compensate for positional deviations produced between the four photographed images (images 101 to 104). More specifically, a positional deviation amount of a position alignment object image relative to a position alignment reference image is detected, and in accordance with the detected positional deviation amount, a positional deviation amount of the position alignment object image is corrected.

In this embodiment, a first photographed image (i.e., the strobe-illuminated image) is used as the position alignment reference image, and a second and subsequent photographed images (i.e., the non-strobe-illuminated images) are each used as the position alignment object image. It should be noted that one of the non-strobe-illuminated images can be used as the position alignment reference image and the remaining non-strobe-illuminated image and the strobe-illuminated image can each be used as the position alignment object image. By photographing the strobe-illuminated image first, it become easy to get a shutter chance for photographing the main subject.

In the shake correction processing, the brightness of the position alignment reference image must be aligned with the brightness of the position alignment object image in order to improve the accuracy of positional alignment. To this end, the image gain-processed in step S311 is used as the strobe-illuminated image to be used for the positional alignment. Since the brightness is different between the strobe-illuminated image and the non-strobe-illuminated image by an amount of strobe emission, the accuracy of position alignment is lowered. Thus, the position alignment is performed after an area in the strobe-illuminated image illuminated with strobe light is excluded from an object of detection of the positional deviation amount.

In the detection of an area illuminated with strobe light, the strobe-illuminated image after the gain processing and the non-strobe-illuminated image are each divided into n×m blocks (where n and m are natural numbers), e.g., 20×20 blocks. Then, if a difference between brightnesses of corresponding blocks of both the images is equal to or greater than a predetermined value, it is determined that the block of the strobe-illuminated image is an area illuminated with strobe light.

Next, the position alignment reference image and the position alignment object image are each divided into plural blocks for edge detection such that each block has e.g. 4×4 pixels, and edge detection processing is performed on the position alignment object image on a per edge detection block. For the edge detection, it is possible to use a method for detecting an edge by subtracting, from an image, a low frequency image obtained by performing low-pass filtering on the image, or use a known edge detection method where a derivative filter or a Prewitt filter is used.

Next, among the edge detection blocks of the position alignment reference image, a block for which an edge has been detected and which have not been illuminated with strobe light (hereinafter, referred to as the positional deviation amount detection reference block) is determined, and a positional deviation amount of the position alignment object image relative to the positional deviation amount detection reference block is detected. By detecting a positional deviation amount relative to only the positional deviation amount detection reference block, the detection accuracy can be improved.

In the positional deviation amount detection, a sum of absolute differences (SAD) between pixel values (brightnesses) of all the pixels of the positional deviation amount detection object block in the position alignment reference image and pixel values in the position alignment object image is calculated, while moving the detection object block in units of pixel. Then, a motion vector for the edge detection block is determined that represents an amount and direction of motion that minimize the calculated SAD. It should be noted that the method for positional deviation amount detection is not limited thereto, and any other known method such as a method for detecting a positional deviation amount between two images by frequency analysis can be used.

Figures 4A, 4B:
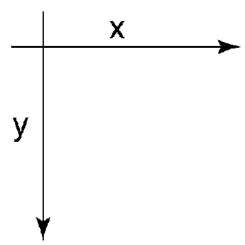
FIGS. 4A and 4B are views respectively showing a positional deviation amount detection reference block in a position alignment reference image and a position alignment object image, which are used for positional deviation amount detection for correcting positional deviations of plural sheets of images.

In the following, with reference to FIGS. 4A and 4B, a description will be given of positional deviation amount detection processing based on motion vector. FIG. 4A shows pixel values in a positional deviation amount detection reference block in the position alignment reference image, and FIG. 4B shows pixel values in a position alignment object image.

In the case of the illustrated example, assuming that coordinate (0, 0) of the left upper corner in FIG. 4B is the reference, it is possible to determine a motion vector (1, 2) that minimizes the sum of absolute differences between pixel values in the positional deviation amount detection object block in the position alignment reference image and pixel values in the position alignment object image. Similarly, motion vectors for all the edge detection blocks are determined, and based on the determined motion vectors, affine coefficients (positional deviation information) for use in affine transformation represented by the following formula (2) are calculated by a known method.

$$\begin{bmatrix} x' \\ y' \\ 1 \end{bmatrix} = \begin{bmatrix} a & b & c \\ d & e & f \\ 0 & 0 & 1 \end{bmatrix} \begin{bmatrix} x \\ y \\ 1 \end{bmatrix} \quad (2)$$

In formula (2), (x, y) denote a coordinate of an image before correction, (x', y') denote a coordinate of an image after correction, and a 3×3 matrix denotes affine coefficients.

Then, the affine transformation represented by formula (2) is performed on respective position alignment object images (non-strobe-illuminated images), thereby performing shake correction.

In step S314 that follows the shake correction processing in step S313, average values of pixel values in one sheet of strobe-illuminated image after the gain processing in step S311 and pixel values in three sheets of non-strobe-illuminated images after the shake correction processing in step S313 are calculated on a per pixel basis. Then, an averaged image (e.g., image 106 shown by way of example in FIG. 1) is created based on the calculated average values of pixel values.

By averaging plural sheets of images as described above, a less noisy image can be obtained while not changing the brightness of the background. By synthesizing the gain-processed strobe-illuminated image and plural non-strobe-illuminated images, the noise reduction effect can be further enhanced as compared to a case where only the non-strobe-illuminated images photographed under the same luminosity are synthesized.

In the image synthesis in step S314, the strobe-illuminated image and the non-strobe-illuminated images different in brightness from the strobe-illuminated image are averaged, and therefore a human subject area does not have a proper brightness. To obviate this, the below-described processing is performed in steps S315 and S316.

In step S315, an amount of strobe illumination that represents the degree of influence of strobe light on the strobe-illuminated image is calculated on a per pixel basis.

First, the strobe-illuminated image gain-processed in step S311 is subjected to low-pass filtering to thereby obtain a low frequency image, and the non-strobe-illuminated image obtained by the second shot and subjected to the shake correction in step S313 is subjected to low-pass filtering to obtain a low frequency image. By performing the low-pass filtering on the images as described above, the amount of strobe illumination can be suppressed from being erroneously calculated due to noise. By comparing the image obtained by the second shot closest to the strobe emission photographing with the strobe-illuminated image, it is possible, for example, to suppress the influence of hand shake on a photographed area including a person who is the main subject to a minimum.

Figure 5:
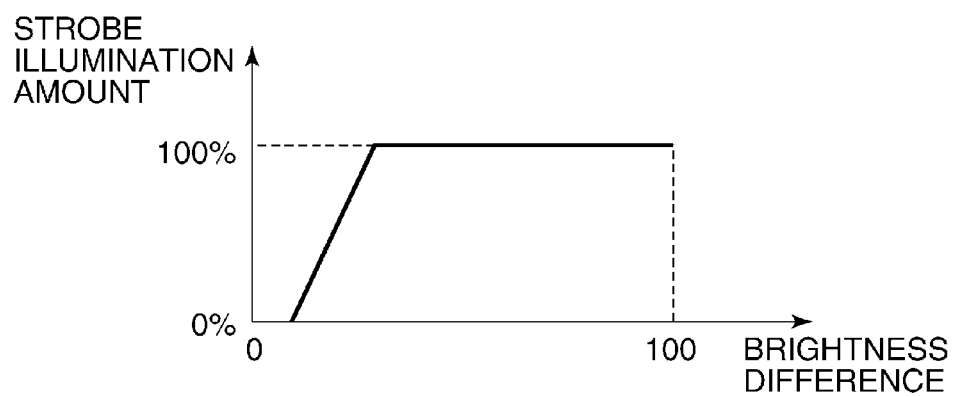
FIG. 5 is a view showing an example of a brightness difference vs. strobe illumination amount table for use in calculating an amount of strobe illumination in an image from a difference between a brightness value in a position alignment reference image and a brightness value in a position alignment object image.
Figure 5:
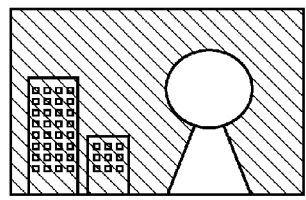
Figure 5:
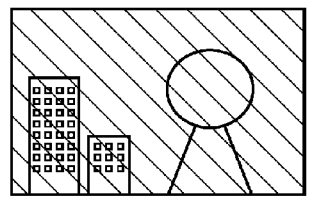
Figure 5:
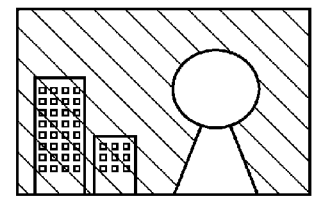

Next, a difference between brightness values Y in these two images is determined on a per pixel basis, and an amount of strobe illumination is calculated on a per pixel basis with reference to a brightness difference vs. strobe illumination amount table prepared in advance and shown in FIG. 5. According to the brightness difference vs. strobe illumination amount table of FIG. 5, the amount of strobe illumination has a large value in a pixel where the brightness difference is large, whereas it has a small value in a pixel where the brightness difference is small, whereby a fear that the amount of strobe illumination is erroneously calculated is decreased.

It should be noted that in this embodiment, the amount of strobe illumination is calculated from a brightness difference between two images, however, the amount of strobe illumination can also be calculated from a difference between color differences U, V in the two images. A large brightness difference is sometimes caused by a shift due to a motion of the photographic subject or due to insufficient handshake correction. To obviate this, it is possible to calculate the amount of strobe illumination from a value obtained by dividing the brightness difference by the brightness value in the non-strobe-illuminated image.

Data of the amounts of strobe illumination calculated on a per pixel basis is stored in the memory 410. An image 107 in FIG. 2 schematically shows a result of the processing performed in step S315 to calculate the amounts of strobe illumination. In the image 107, a white area on the right side represents that the amount of strobe illumination is large. It should be noted that a white area on the left side is a street light area.

Next, in step S316, the strobe-illuminated image (image 101) photographed in step S302 and the averaged image (image 106) created in step S314 are synthesized on a per pixel basis, while taking account of the strobe illumination amount in each pixel calculated in step S315, in accordance with the following formula (3).

Pixel value after synthesis=(Pixel value in image 101× Strobe illumination amount %)+{Pixel value in image 106×(100%−Strobe illumination amount %)} (3)

An image 108 in FIG. 2 represents a final synthesized image obtained by the image synthesis in step S316.

When the image synthesis in step S316 is completed, i.e., when the synthesis process in step S306 in the overall process of FIG. 3A is completed, image data of the synthesized image (image 108) is stored into the external storage device 412 (step S307), whereupon the overall process is completed.

As described above, in this embodiment, the exposure conditions for the strobe emission photographing and the non-strobe emission photographing are decided in step S301, the gain amount G is decided to compensate for a brightness difference generated due to a sensitivity difference between the exposure conditions, the shake correction is performed based on positional deviation amounts detected from the strobe-illuminated image after the gain processing and the non-strobe-illuminated images, and the amounts of strobe illumination that represent the degree of influence of strobe light on the strobe-illuminated image are calculated in step S315. It is therefore possible to properly take account of the influence of strobe light even in a photographing scene where a person is illuminated. As a result, a proper synthesized image can be obtained. For example, strobe-illuminated and non-strobe-illuminated images are not mixed with each other in an image of one person.

It should be noted that in this embodiment, three sheets of non-strobe-illuminated images are photographed in steps S303 to S305, however, it is possible to enhance the effect of reducing noise in the averaged image created in step S314 by increasing the number of photographed sheets of non-strobe-illuminated images. By increasing the number of photographed sheets of non-strobe-illuminated images, the noise reduction effect can be enhanced in the background area. On the other hand, the noise reduction effect cannot be achieved in the human subject area illuminated with strobe light because one sheet of strobe-illuminated image is used for the final synthesized image. As a result, there is a difference in feeling of noise between the background area and the human subject area of the image. To avoid such a problem, it is preferable, for example, that the sensitivity of strobe emission photographing is set to be lower in step S301 with increase of the number of photographed (synthesized) sheets of non-strobe-illuminated images.

In this embodiment, the strobe illumination amounts are calculated while referring to the brightness difference vs. strobe illumination amount table shown in FIG. 5, and pixel values decided while taking account of the strobe illumination amounts in accordance with formula (3) are used for the image synthesis in step S316, but this is not limitative. For example, it is possible to perform the gain processing in step S311 by using a gain amount which is set to be smaller than the gain amount G calculated according to the aforesaid formula (1), and perform the image synthesis in step S316 by selecting on a per pixel basis either pixel values in the strobe-illuminated image (image 101) photographed in step S302 or pixel values in the synthesized image (image 106) synthesized in step S314, whichever are brighter, and by creating a final synthesized image based on the selected pixel values.

OTHER EMBODIMENTS

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-096518, filed Apr. 20, 2012, which is hereby incorporated by reference herein in its entirety.

What is claimed is:

1. An image processing apparatus comprising:
    a photographing unit configured to photograph a first image by first photographing with an emission by an emission unit and a plurality of second images by second photographing without the emission;
    a sensitivity setting unit configured to set a sensitivity of the first photographing to be lower than a sensitivity of the second photographing;
    a gain processing unit configured to perform gain processing in which image data of the first image is multiplied by a gain amount;
    an averaging unit configured to create an averaged image based on the first image gain processed by said gain processing unit and the plurality of second images; and
    a synthesis unit configured to create a synthesized image using the first image photographed by said photographing unit and the averaged image created by said averaging unit.

2. The image processing apparatus according to claim 1, wherein said gain processing unit multiplies the first image by a gain amount that compensates for a sensitivity difference between the sensitivity of the first photographing and the sensitivity of the second photographing that are set by said sensitivity setting unit.

3. The image processing apparatus according to claim 1, wherein said sensitivity setting unit sets the sensitivity of the first photographing to be lower with increase of a number of photographed sheets of the second images.

4. The image processing apparatus according to claim 1, further including:
    a positional deviation correcting unit configured to detect positional deviation amounts of the plurality of second images relative to the first image, and correct positional deviations of the plurality of second images based on the detected positional deviation amounts.

5. The image processing apparatus according to claim 4, wherein when detecting the positional deviation amounts of the plurality of second images relative to the first image, said positional deviation correcting unit uses, as the first image, the first image gain-processed by said gain processing unit.

6. The image processing apparatus according to claim 1, further including:
    an illumination amount determining unit configured to determine amounts of illumination in the first image in contrast with the second image,
    wherein said synthesis unit creates the synthesized image based on the amounts of illumination.

7. The image processing apparatus according to claim 6, wherein said illumination amount determining unit determines the amounts of illumination based on differences of brightness values between the first image and the second image.

8. The image processing apparatus according to claim 1, wherein said averaging unit calculates, on a per pixel basis, average values of pixel values of the first image gain-processed by said gain processing unit and pixel values of the plurality of second images, and create the averaged image based on calculated average values of the pixel values.

9. The image processing apparatus according to claim 1, wherein said synthesis unit create the synthesized image in which the first image is used for an area illuminated with strobe light, whereas the averaged image is used for the other area not illuminated with strobe light.

10. An image processing apparatus comprising:
    a photographing unit configured to photograph a first image by first photographing with an emission by an emission unit and a plurality of second images by second photographing without the emission;
    a sensitivity setting unit configured to set a sensitivity of the first photographing to be lower than a sensitivity of the second photographing;
    a gain processing unit configured to perform gain processing in which image data of the first image is multiplied by a gain amount;
    an averaging unit configured to create an averaged image based on the first image gain processed by said gain processing unit and the plurality of second images; and
    a synthesis unit configured to compare pixel values of the first image photographed by said photographing unit with pixel values of the averaged image created by said averaging unit and select pixel values, whichever are brighter, and create a synthesized image based on the selected pixel values.

11. An image processing method executed by an image processing apparatus, comprising:
    a sensitivity setting step of setting a sensitivity of a first photographing with an emission by an emission unit to be lower than a sensitivity of a second photographing without the emission;
    a photographing step of photographing a first image by the first photographing and a plurality of second images by the second photographing with the sensitivities set in said sensitivity setting step;
a gain processing step of performing gain processing in which respective pixel values of the first image are each multiplied by a gain amount;
an averaging step of creating an averaged image based on the first image gain processed in said gain processing step and the plurality of second images; and
a synthesis step of creating a synthesized image by synthesizing, on a per pixel basis, the first image photographed in said photographing step and the averaged image created in said averaging step.

12. An image processing method executed by an image processing apparatus, comprising:
a sensitivity setting step of setting a sensitivity of a first photographing with an emission by an emission unit to be lower than a sensitivity of a second photographing without the emission;
a photographing step of photographing a first image by the first photographing and a plurality of second images by the second photographing with the sensitivities set in said sensitivity setting step;
a gain processing step of performing gain processing in which respective pixel values of the first image are each multiplied by a gain amount;
an averaging step of creating an averaged image based on the first image gain processed in said gain processing step and the plurality of second images; and
a synthesis step of comparing pixel values of the first image photographed in said photographing step with pixel values of the averaged image created in said averaging step and selecting pixel values, whichever are brighter, and creating a synthesized image based on the selected pixel values.

13. An image processing apparatus comprising:
a photographing unit configured to photograph a first image by first photographing with an emission by an emission unit and a plurality of second images by second photographing without the emission;
a sensitivity setting unit configured to set a sensitivity of the first photographing to be lower than a sensitivity of the second photographing;
a gain processing unit configured to perform gain processing in which image data of the first image is multiplied by a gain amount;
an adding unit configured to create an added image based on the first image gain processed by said gain processing unit and the plurality of the second images; and
a synthesis unit configured to create a synthesized image by synthesizing the first image photographed by said photographing unit and the added image created by said adding unit.

14. The image processing apparatus according to claim 13, further including:
an illumination amount determining unit configured to determine amounts of illumination in the first image in contrast with the second image,
wherein said synthesis unit create the synthesized image based on the amounts of illumination.

15. The image processing apparatus according to claim 13,
wherein said synthesis unit create the synthesized image in which the first image is used for an area illuminated with strobe light, whereas the added image is used for the other area not illuminated with strobe light.

16. An image processing method executed by an image processing apparatus, comprising:
a sensitivity setting step of setting a sensitivity of a first photographing with an emission by an emission unit to be lower than a sensitivity of a second photographing without the emission;
a photographing step of photographing a first image by the first photographing and a plurality of the second images by the second photographing with the sensitivities set in said sensitivity setting step;
a gain processing step of performing gain processing in which respective pixel values of the first image are each multiplied by a gain amount;
an adding step of creating an added image based on the first image gain processed in said gain processing step and the plurality of the second images; and
a synthesis step of creating a synthesized image by synthesizing, on a per pixel basis, the first image photographed in said photographing step and the added image created in said adding step.

* * * * *